United States Patent [19]

Bailey

[11] Patent Number: 4,546,567
[45] Date of Patent: Oct. 15, 1985

[54] FISHING LINE SINKER

[76] Inventor: Danny J. Bailey, 242 Walnut St., Fort Collins, Colo. 80524

[21] Appl. No.: 571,427

[22] Filed: Jan. 17, 1984

[51] Int. Cl.⁴ ............................................. A01K 95/00
[52] U.S. Cl. ................................. 43/44.87; 43/44.89; 43/44.9; 43/44.95
[58] Field of Search ................... 43/44.87, 44.89, 44.9, 43/44.91, 44.92, 44.93, 44.95

[56] References Cited

U.S. PATENT DOCUMENTS

| | | | |
|---|---|---|---|
| 2,570,293 | 10/1951 | Vadnais | 43/44.91 |
| 2,807,907 | 10/1957 | Brite | 43/44.91 |
| 3,196,575 | 7/1965 | Kotis | 43/44.89 |
| 3,733,734 | 5/1973 | Hysaw | 43/44.9 |
| 3,808,728 | 5/1974 | Ratte, Jr. | 43/44.91 |
| 3,867,783 | 2/1975 | Simpson | 43/44.91 |
| 4,138,795 | 2/1979 | Welle | 43/44.89 |

Primary Examiner—Nicholas P. Godici
Assistant Examiner—Kurt Rowan
Attorney, Agent, or Firm—Dean P. Edmundson

[57] ABSTRACT

An improved sinker is described for use on a fishing line. The sinker may be adjustably positioned on the line without the need for tying knots in the line or attaching any auxillary connectors to the line. Accordingly, the danger of line breakage is reduced, and the practicality of use is enhanced. The sinker includes a tube member stretched between two points. The line passes through the tube member and is frictionally engaged thereby when the tube is twisted.

7 Claims, 2 Drawing Figures

FISHING LINE SINKER

FIELD OF THE INVENTION

This invention relates to sinkers or weights attached to fishing lines to hold the hook or bait below the surface of the water. More particularly, this invention relates to improved sinkers and methods for attaching sinkers to the line.

BACKGROUND OF THE INVENTION

For certain types of fishing it is necessary or desirable to weight the fishing line so that the hook and bait are held below the surface of the water. This is particularly true when trolling, and it is especially important when deep sea fishing.

The use of various types of sinkers tied to the fishing line is very old, and many different types of sinkers or weights have been used over the years. For example, conventional lead weights having an eyelet on one end have been very common. In order to attach such weights, however, it is necessary to tie the line through the eyelet or tie the line to a leader which is then connected to the weight. It is also common to use weights such as spark plugs, burrs, and other chunks of metal.

Another type of conventional weight includes a longitudinal slot in which the line is placed, and then the body of the weight itself is pinched tightly against the line so as to fix the position of the weight. Still another type of weight includes a rubber insert (much like the shape of a dog bone) positioned with a longitudinal slot in the body. After the line is placed in the slot the ends of the rubber insert are twisted in opposite directions so as to wedge the line against the walls of the slot.

One disadvantage of many types of conventional fishing line weights is that the line must be tied around or through the weight. This then creates kinking and consequent weakening of the line. When a fish is caught and fights the line there is significant stress placed on the line in those areas where it is tied or kinked. Consequently, the line is very apt to break in such areas of high stress. Another disadvantage of many known types of sinkers is that they are tied securely to the line and their position on the line cannot be changed without untying them. This is extremely difficult to do and as a practical matter a fisherman normally cuts off a portion of the original line and then reties the weight, hook, etc. on a new portion of the line.

Although the type of sinker which includes the rubber dogbone insert may be loosened and then re-positioned on the original line, sometimes it becomes loosened unintentionally and slides to an undesired portion of the line. Moreover, the ends of this type of weight normally have rather sharp edges which can cut the line when a fish is hooked and is fighting the line.

Consequently, the various types of weights which have been previously used on fishing line have not been fully satisfactory for all situations. This is especially true for deep sea fishing where the various stresses on the line are exaggerated and the size of the fish being caught is usually greater than in conventional lake fishing.

The present invention provides an improved sinker for use on a fishing line which overcomes the disadvantages associated with conventional sinkers.

SUMMARY OF THE PRESENT INVENTION

In accordance with the present invention there is provided an improved sinker for use on fishing lines and the like which is adjustably positionable on the line and which does not present the problem of cutting the line during use. The improved sinker, in one embodiment, includes:

(a) a weighted body having first and second spaced apart openings;
(b) an elongated, resilient, stretchable tube member disposed between said openings, wherein one end of the tube is secured at said first opening of the weighted body; and
(c) a knob member secured to the opposite end of the tube.

The tube member is stretched between the first and second openings in a manner such that the knob member is normally urged toward the second opening. The tube member has an axial bore through it of variable internal diameter normally greater than the diameter of the fishing line so that the weighted body can slide freely along the line when the tube is in untwisted condition. The knob member is adapted to be rotated in a manner such that the tube becomes twisted and frictionally engages the fishing line so as to clamp the weighted body to the line at the desired position.

The sinker of the present invention avoids the need for knotting the line in order to secure the sinker in the desired position. Furthermore, the sinker does not have a tendency to cut or tear the line. Also, the position of the sinker on the line may be readily and quickly adjusted as desired.

BRIEF DESCRIPTION OF THE DRAWINGS

The invention is described in more detail hereinafter with reference to the accompanying drawings, wherein like reference characters refer to the same parts throughout the several views and in which.

DETAILED DESCRIPTION OF THE INVENTION

Figure 1:
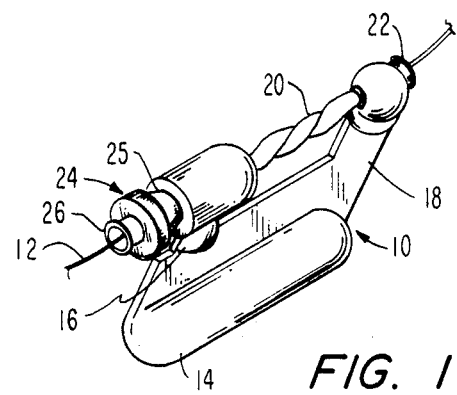
FIG. 1 is a perspective view of one embodiment of sinker of this invention.

In FIG. 1 there is shown sinker 10 which is secured to fishing line 12 or the like. Sinker 10 includes a weighted body 14 with upright arm portions 16 and 18 which each have an opening extending therethrough. Disposed between the openings is an elongated, resilient, stretchable rubber tube member 20 which has an axial bore through it which is normally larger than line 12 so as to accommodate free sliding movement of sinker 10 along the line when tube 20 is in untwisted condition.

Preferably one end of tube 20 is secured to a grommet 22 at the opening in arm 18. The grommet is smooth and free of sharp edges so that it does not cut line 12 at any point and may be made of metal or other suitable material. A simple means of securing the end of tube 20 is to stretch it over a tubular member having a flared end which forms the grommet. This assembly may then be press-fitted into the opening in arm 18 where it is securely retained in fixed position.

The opposite end of tube 20 passes through an opening in arm member 16 and is secured to knob member 24. In the embodiment shown here the end of the tube 20 is stretched over a grommet 26 which is smooth and free of sharp edges which would cut the line 12. The grommet may be made of metal or other suitable material. The tube-grommet assembly is preferably press-fitted into an opening extending through knob member 24.

Knob member 24 preferably includes frusto-conical portion 25 which is adapted to be removably seated in the opening in arm member 16. It is also preferably for the opening in arm member 16 to include inclined wall surfaces which mate with the frusto-conical portion of knob member 24. Tube 20 has a length such that it is stretched slightly between arm members 16 and 18.

To clamp or secure sinker 10 to line 12 at the desired position it is necessary only to rotate knob member 24 in order to cause tube 20 to twist (as shown in FIG. 1) whereby the interior diameter of tube 20 between arm member 16 and 18 becomes smaller and tightly frictionally engages line 12. Of course, the twisting of tube 20 also causes knob member 24 to be more tightly retained against arm member 16. Frictional engagement of portion 25 in the opening in arm member 16 prevents knob member 24 from inadvertent rotation in the opposite direction.

If desired, portion 25 of knob member 24 and the opening in arm member 16 may be adapted to positively engage so as to lock the knob member 24 against rotation. For example, portion 25 may include a rib or other protrusion which engages an appropriate slot or recess in the opening in arm member 16.

The weighted body is normally made of lead or other suitable material having a density greater than that of water. For example, steel, iron, brass or similar materials may also be used. The shape and size of the weighted body may also vary, as desired. Of course, any number of sinkers may be used on a line. Common weights are about 2 to 8 ounces each.

The size and length of tube 20 between its two points of support on the weighted body may also vary. A length in the range of about 0.75 to 3 inches is normally used. The internal diameter of the tube may also vary, depending upon the size of the line to which it is to be attached. It has been found that an internal diameter of the tube in its slightly stretched assembled condition of one-eighth to three-sixteenths inch is appropriate for most common uses.

Figure 2:
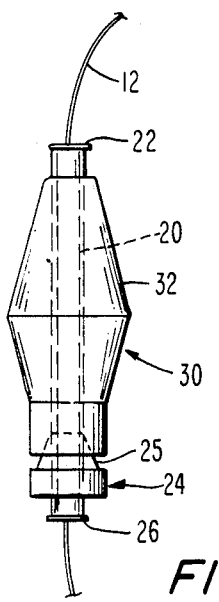
FIG. 2 is an elevational view of another embodiment of sinker of the invention.

In FIG. 2 there is shown another embodiment of sinker 30 comprising weighted body 32 having a conduit extending through it which is sufficiently large to accommodate an elongated, resilient, stretchable rubber tube member 20. One end of tube 20 is attached to a grommet 22 which is annular in shape, smooth, and free of sharp edges which might cut the line 12. This end of tube 20 and grommet 22 are secured to an opening in one end of the weighted body 32. The opposite end of tube 20 is secured to knob member 24. In this embodiment tube 20 is attached to grommet 26 which is in turn secured within a longitudinal bore in knob member 24. Tube 20 is stretched slightly between its two ends.

Sinkers 30 may be slid freely along the line until the desired position is reached, then knob member may be rotated so as to twist tube 20. The twisting of tube 20 causes it to frictionally grip the live 12. Twisting of tube 20 also increases the biasing force pulling knob member 24 inward against the weighted body. The friction between portion 25 and the opening in weighted body 32 prevents knob member 24 from inadvertent rotation to untwist tube 20. Yet, when it is desired to loosen sinker 30 from line 12 it is only necessary to manually rotate knob member 24 in the opposite direction until the tube 20 is untwisted; then sinker 30 may slide freely along line 12. Preferably portion 25 is frusto-conical in shape (as shown), and preferably the opening in the weighted body has inclined wall surfaces adapted to mate with the frusto-conical portion.

Other variants are possible without departing the scope of the present invention.

What is claimed is:

1. A sinker adapted for use on a fishing line and being adjustably positionable on said line, said sinker comprising:
   (a) a weighted body having protruding first and second arm members, wherein said arm members include first and second openings, respectively;
   (b) an elongated, resilient, stretchable tube member disposed between said openings, said tube member having an axial bore therethrough, wherein a portion of said bore has a variable internal diameter normally greater than the diameter of said fishing line to accommodate free sliding movement of said weighted body along said line when said tube is in untwisted condition and also less than the diameter of said line to frictionally clamp said weighted body to said line when said tube is twisted; and wherein one end of said tube member is secured at said first opening; and
   (c) a knob member secured to the opposite end of said tube member;
   wherein said tube member is stretched between said first and second openings in a manner such that said knob member is normally urged toward said second opening, and wherein said knob member is further adapted to be rotated in a manner such that said tube member becomes twisted and frictionally engages said fishing line so as to retain said sinker in desired position on said fishing line.

2. A sinker in accordance with claim 1, wherein said weighted body comprises lead.

3. A sinker in accordance with claim 1, wherein said end of said tube member is secured to a grommet supported at said first opening at said first arm member.

4. A sinker in accordance with claim 1, wherein said first and second openings are axially aligned.

5. A sinker in accordance with claim 1, wherein said knob member includes a frusto-conical portion which is adapted to be removeably seated within said second opening.

6. A sinker in accordance with claim 5, wherein said tube member has a length in the range of about 0.75 to 3 inches.

7. A sinker in accordance with claim 1, wherein said knob member is adapted to be rotatable relative to said arm members.

* * * * *